United States Patent
Li et al.

[19]

[11] Patent Number: 6,030,066
[45] Date of Patent: Feb. 29, 2000

[54] METHOD AND APPARATUS FOR INK JET PRINTER COLOR BALANCE CALIBRATION AND CORRECTION

[75] Inventors: Guo Li; Francis E. Bockman, both of San Diego, Calif.; Joseph M. Torgerson, Philomath, Oreg.

[73] Assignee: Hewlett-Packard Company, Palo Alto, Calif.

[21] Appl. No.: 08/961,730

[22] Filed: Oct. 31, 1997

[51] Int. Cl.[7] .................................................. B41J 29/393
[52] U.S. Cl. ............................................................ 347/19
[58] Field of Search ........................... 347/14, 19; 399/39

[56] References Cited

U.S. PATENT DOCUMENTS

| | | | |
|---|---|---|---|
| 3,799,668 | 3/1974 | McVeigh | 399/28 |
| 5,387,976 | 2/1995 | Lesniak | 347/19 X |
| 5,604,567 | 2/1997 | Dundas et al. | 399/39 |
| 5,809,366 | 9/1998 | Yamakawa et al. | 399/39 |
| 5,917,511 | 6/1999 | Ueda | 347/19 |

FOREIGN PATENT DOCUMENTS

| | | |
|---|---|---|
| 62-251628 | 11/1987 | Japan . |
| 3-69272 | 3/1991 | Japan . |
| 4-170268 | 6/1992 | Japan . |

*Primary Examiner*—William J. Royer

[57] ABSTRACT

A method, for adjusting the color balance of printheads in a color printer, utilizes a matrix of image data including a reference image data set for a reference image and a plurality of color modified image data sets for plural color modified images. The reference image data set includes in-balance component color data values and each of the color-modified image data sets include out-of-balance component color values. A printer is controlled to operate the printheads to print the reference image and each of the color modified images at pre-determined locations on a media sheet in accord with the matrix of image data. If the printheads are not properly adjusted, the printed reference image and each of the color modified images appear positionally offset on the media sheet. A user, upon examining the media sheet selects one image on the media sheet as the reference image (e.g., the image which exhibits best black/white characteristics and contrast). In response to that selection, control signals are altered to the printheads in accord with component color values that are initially established for the matrix position that is now occupied by the image selected as the reference image. Such component color values are thereafter used to correct for subsequent printing.

20 Claims, 4 Drawing Sheets

COLOR BALANCE
CALIBRATION TABLE
52

| SubImage INDEX | MAGENTA | CYAN |
|---|---|---|
| A | −30 | −30 |
| B | −30 | −15 |
| C | −30 | 0 |
| F | −15 | −30 |
| G | −15 | −15 |
| M | 0 | 0 |
| V | +30 | −30 |
| W | +30 | −15 |

FIG.3

METHOD AND APPARATUS FOR INK JET PRINTER COLOR BALANCE CALIBRATION AND CORRECTION

FIELD OF THE INVENTION

This invention relates to color ink jet printers and, more particularly, to a method and apparatus for adjusting a color imbalance which results from different drop weights.

BACKGROUND OF THE INVENTION

Modern color ink jet printers are often provided with plural printheads, each printhead capable of outputting two or more colors onto a media sheet. In particular, an ink jet printer may be provided with a dual pen arrangement wherein one pen has dark magenta, light magenta and yellow inks and the other pen includes dark cyan, light cyan, and black inks. Hereafter, a printhead with magenta ink will be called the magenta printhead and a printhead with the cyan ink will be called the cyan printhead.

Manufacturing specifications for such printheads set limits for ink drop weights that are emitted from printhead orifices. If the drop weights vary by too great an amount, an unwanted hue-shift occurs in a resulting print.

However, the tighter the limits on the drop weight, the more costly is the manufacturing process for the printhead.

Accordingly, it is desired to provide a means for enabling a printer to accommodate printheads having relatively wide variations in drop weight, while achieving high quality print results.

Manufacturing experience with multicolor printheads indicates that the standard deviation of drop weight between printheads is about three times that of channel-to-channel variations within a single printhead. Accordingly, it is most important to correct for drop weight variations between printheads, rather than attempting to correct for drop weight variations that occur within a single printhead. Further, while minimizing drop weight variance is an important factor in retaining print quality, other factors like media variation, temperature and humidity changes and variations in electronics within the printer also contribute to hue-shifts.

In order to correct for hue-shifts, some high end printers are provided with a sensor, or even a calorimeter, to test the color of certain print tiles. The drop weight of each printhead is then calculated from the calorimetric data and subsequent printing actions are compensated, based on the calculated data. While such a system does not require user input, the disadvantage is the cost of providing a sensor and/or calorimeter within the printer. In many low cost printers, the hue-shift problem is simply ignored.

For printers which produce high quality output prints, the hue shift problem can significantly affect print quality. Statistical analyses shows that 50% of printers will suffer more or less from this problem, and that 5% of those printers will generate prints that are not acceptable to normal users. Attempts have been made to hide the drop weight variation problem rather than to solve it. This is achieved by arranging the printheads so that one is provided with black, cyan-dark and magenta-dark inks, and the other is provided with yellow, cyan-light and magenta-light inks. In such case, no matter how different are the drop weights of the two printheads, dark cyan and dark magenta always track each other in drop weight (because they are emitted from the same printhead). So do the light cyan and light magenta drop weights. As a result, an imbalance between the printheads only has some effect on the image contrast, rather than its hue. Variations in image contrast are more acceptable to most users. The disadvantage is that if there is some misalignment between the two printheads, regions with light ink to dark ink (light magenta to dark magenta, light cyan to dark cyan) will look worse. Further, the dark magenta ink may not overlap properly with the light magenta ink. This will significantly affect certain important color regions, such as flesh tones.

Finally, in order to accommodate the drop weight variation problem, the drop weight of each printhead can be measured on the production line and this information recorded on the printhead and later recognized by the printer. This increases the expense of both printhead production and requires additional cost be added to the printer. Further, the drop weight of each individual printhead can change over the printhead's lifetime.

Accordingly, it is an object of this invention to provide an improved method and apparatus for compensating for print variations which result from variations in drop weight.

It is another object of this invention to provide an improved method and apparatus for color balance calibration of an ink jet printhead which does not require an addition of calibration apparatus to the printer.

It is yet another object of this invention to provide an improved method and apparatus for color balance calibration of an ink jet printer which accommodates for drop weight and media changes over the lifetime of a printhead.

SUMMARY OF THE INVENTION

A method, for adjusting the color balance of printheads in a color printer, utilizes a matrix of image data including a reference image data set for a reference image and a plurality of color modified image data sets for plural color modified images. The reference image data set includes in-balance component color data values and each of the color-modified image data sets include out-of-balance component color values. A printer is controlled to operate the printheads to print the reference image and each of the color modified images at pre-determined locations on a media sheet in accord with the matrix of image data. If the printheads are not properly adjusted, the printed reference image and each of the color modified images appear positionally offset on the media sheet. A user, upon examining the media sheet selects one image on the media sheet as the reference image (e.g., the image which exhibits best black/white characteristics and contrast). In response to that selection, control signals are altered to the printheads in accord with component color values that are initially established for the matrix position that is now occupied by the image selected as the reference image. Such component color values are thereafter used to correct for subsequent printing.

BRIEF DESCRIPTION OF THE DRAWINGS

FIG. 3 is a schematic of a color balance conversion table that is utilized in response to a user-selection input of a sub-image from the color balance page of FIG. 2.

DETAILED DESCRIPTION OF THE INVENTION

Recall that the most significant color balance problems occur when drop weight values experience significant variation between plural printheads in a printer. To correct this problem, the method of the invention initially causes the printing of a color balance page with a number of sub-images. If the printhead drop weights are equal or substantially so, a reference sub-image, generally centered on the color balance page, exhibits both a best contrast and a best black/white color balance. If the drop weights of the two printheads differ, the drop weight variations cause the black/white reference sub-image to occur at some other sub-image position on the color page.

Such displacement of the sub-image within the color balance page is the result of the drop weight imbalance and causes all sub-images to be shifted from their default positions on the page. Thereafter, the user is caused to enter an indicator of the position on the color balance page of the reference sub-image. Such entry enables a color balance conversion table to be accessed which outputs drop weight variation values for the indicated position on the page. Those values are then indicative of the shift in drop weights that have occurred to cause the positional displacement of the reference image. Those shifts are thereafter used to alter all color printing, and the effect is to reverse the drop weight imbalance.

Thus, if the position of the reference sub-image in the matrix is found to be at other than a central location in the matrix of sub-images, the color balance conversion table indicates the changes in drop weight which have caused such offset in position. Accordingly, those same values are then used to alter control signals for the respective printheads so that the color control values applied thereto, take into account the drop weight variations.

Figure 1:
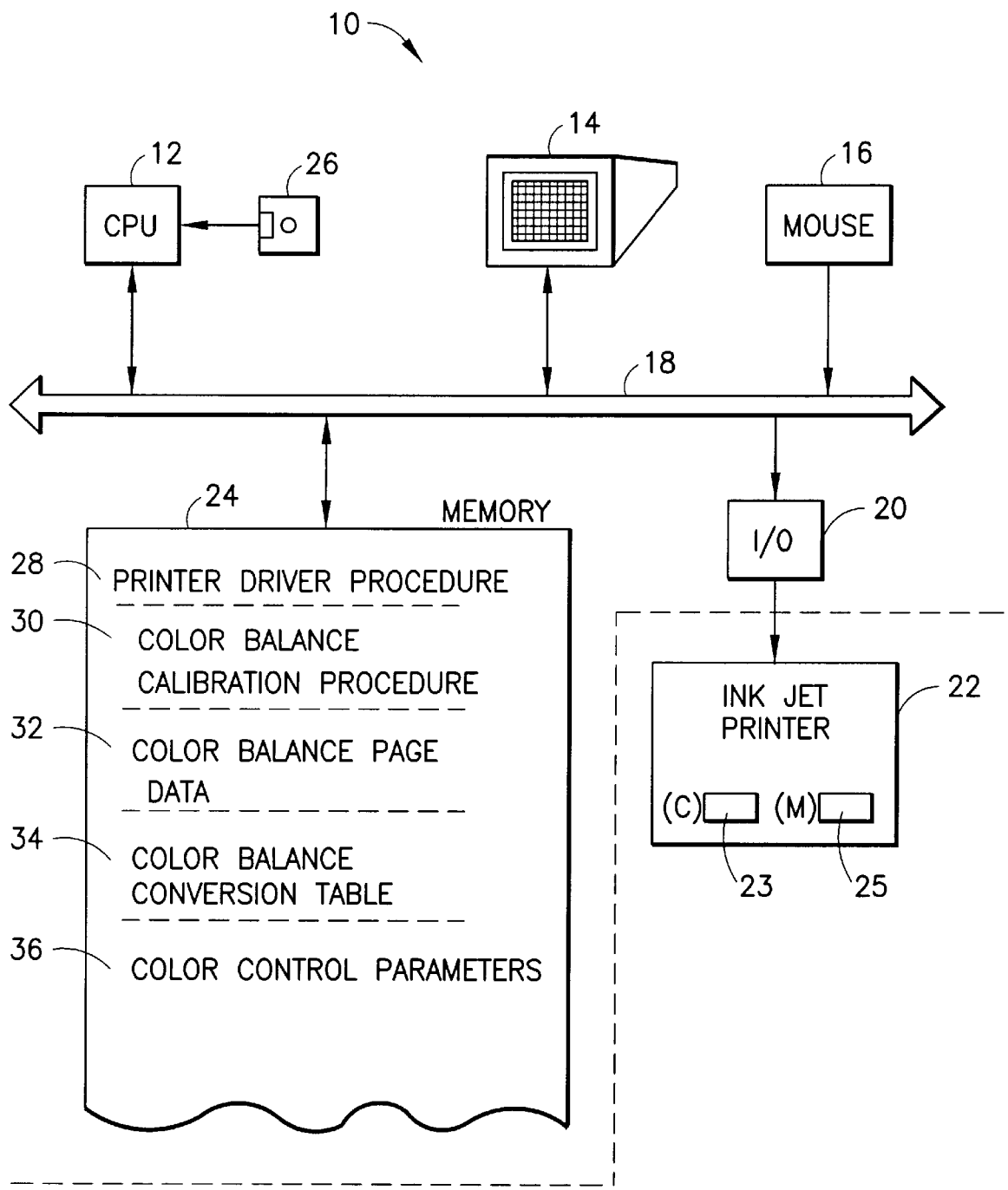
FIG. 1 is a block diagram of a system for performing the invention.

Referring now to FIG. 1, a computer 10 includes a central processing unit (CPU) 12, a display 14 and a mouse 16. A bus system 18 connects the various elements of computer 10 and enables control and data signals to be passed therebetween. An input/output module 20 provides an interface between an inkjet printer 22 and computer 10. It will be hereafter be presumed that inkjet printer 22 contains at least two printheads, a magenta printhead 23 and a cyan printhead 25.

A memory 24 is coupled to bus system 18 and includes various procedures and subprocedures that are employed to control CPU 12, so that the method of the invention may be carried out. While each of the procedures and subprocedures to be described below are shown as already present in memory 24, it is to be understood that each thereof can also be stored on a media disk 26 and, in turn, utilized therefrom to control the operation of CPU 12.

A printer driver procedure 28 is stored in memory 24 and enables computer 10 to communicate both control and print data to inkjet printer 22. Printer driver procedure 28 includes a color balance calibration procedure 30 which implements the method of the invention. Data describing a color balance page 32 is stored in memory 24, as is a color balance conversion table 34. Their use will become more apparent from the description below. Further, a plurality of color control parameters 36 are stored in memory 24 and are utilized by printer driver procedure 28 when specifying image color values to be sent to inkjet printer 22. It is color control parameters 36 that are altered in response to the execution of color balance calibration procedure 30.

Figure 2:
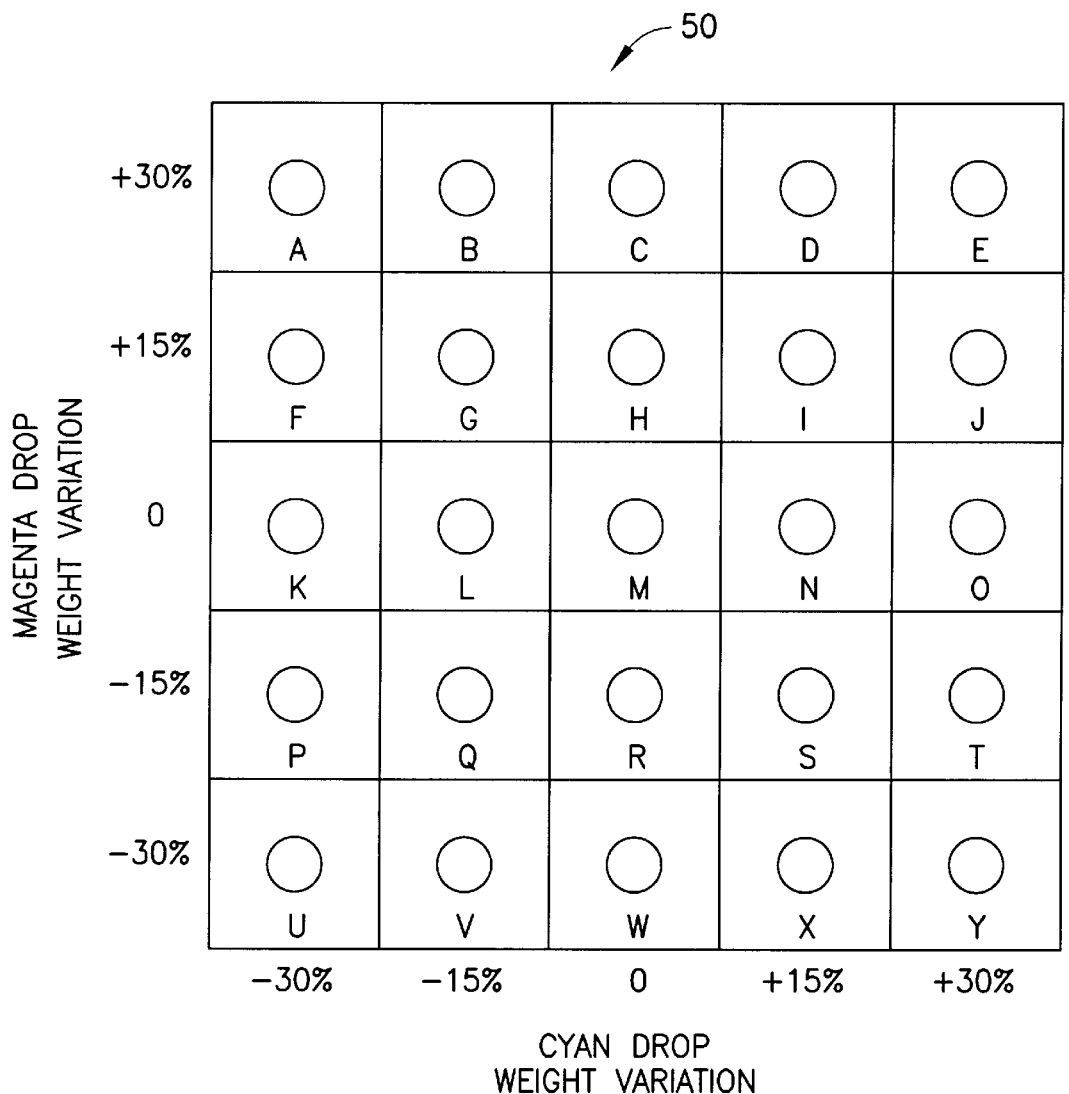
FIG. 2 is a schematic diagram illustrating a color balance page which is employed to enable a user to enter selection data to revise color balance calibration data.

Turning now to FIG. 2, a color balance page 50 is illustrated which, in this example, includes a 5×5 matrix of 25 sub-images (A-Y). To produce color balance page 50, it is assumed that inkjet printer 22 employs both cyan printhead 23 and magenta printhead 25. The color balance values for sub-image M are set based upon a presumption that the drop weights from both cyan printhead 23 and magenta printhead 25 in printer 22 are equal, thereby achieving an optimum black/white reference sub-image. All other sub-images within color balance page 50 are adjusted so that they represent a drop weight variation from nominal in at least one printhead. Accordingly, each of the other sub-images manifests an off-color condition from the reference black/white sub-image.

Thus, sub-image A is printed, based upon an assumption of a 30% drop weight reduction from magenta printhead 25 and a 30% reduction in drop weight from cyan printhead 23. By contrast, sub-image Y is printed, based upon an assumption of a 30% increase in drop weight from cyan printhead 23 and a 30% increase in drop weight from magenta printhead 25. In like manner, each of sub-images K-O are printed, based upon an assumption of nominal magenta drop weights, with variations in the cyan drop weights of from −30% to +30%, respectively.

Given substantially equal drop weights (that are within tolerances) from cyan and magenta printheads 23, 25, generally only one sub-image (M) will manifest a black/white image with a desired contrast level.

FIG. 3 illustrates a color balance calibration table 52 which lists, for each sub-image, the variations in drop weight that are utilized to produce the respective color balance page sub-images. As will be hereafter understood, it is those values that are retrieved from color balance calibration table 52 and utilized to alter the calibration parameters contained in color control parameters 36 (FIG. 1).

Those skilled in the art will realize that color balance page 50 may be maintained in area 32 of memory 24 in the form of multiple sub-image data sets, with each sub-image data set including a color value for each pixel. Otherwise, a base image may be stored and the remaining images created when the procedure is to run. Each color value at least includes two sub-values which define the color hue. Accordingly, such color values for each sub-image are adjusted to provide a sub-image in accordance with the drop weight variation percentages shown in FIG. 2. Thus, the color values of the sub-image data sets in color balance page 32 will achieve a simulation of a plurality of drop weight imbalances as between the cyan pen and magenta pen. Further, those sub-images will only be located as shown on color balance page 50, if the drop weights are the same from cyan and magenta printheads 23, 25.

More specifically, if cyan and magenta printheads 23, 25 contained within inkjet printer 22 exhibit substantially identical drop weights, a media sheet printed using the data from color balance page 32 will exhibit reference sub-image M at the central location shown in FIG. 2. If, however, the drop weights of cyan printhead 23 and magenta printhead 25 differ, then the reference image will not appear at position M, but will rather be offset to some other sub-image position within color balance page 50. Thus, if magenta printhead 25 exhibits a drop weight variation of +15% and cyan printhead 23 exhibits a drop weight variation of −15%, then the reference sub-image (e.g. black/white) appears at the position of sub-image Q and all of the remaining sub-images are offset in a similar manner.

Figure 4:
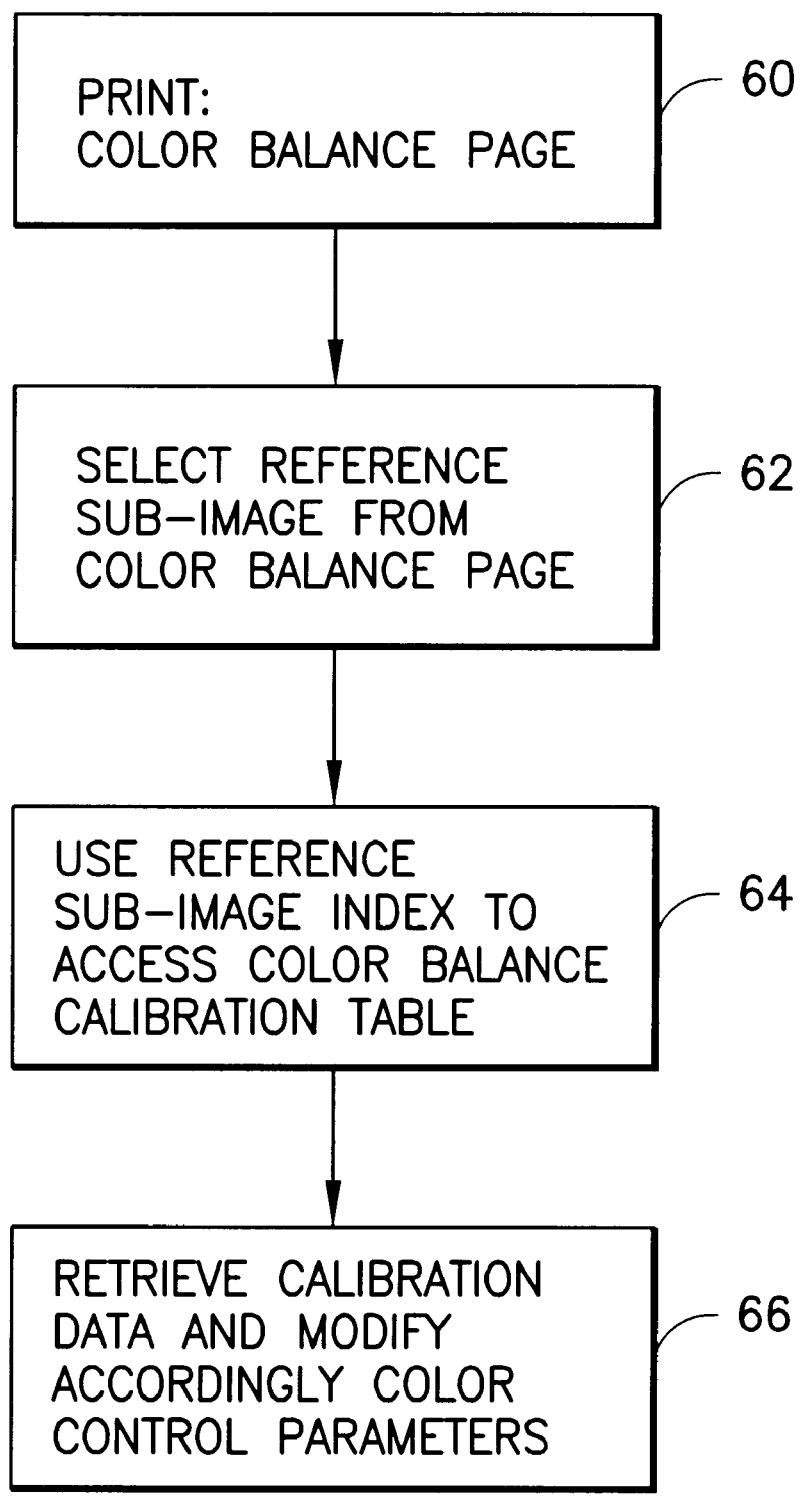
FIG. 4 is a logical flow diagram of the procedure of the invention.

It is this positional offset of the reference sub-image which is employed in the method of the invention to enable an establishment of new color calibration values for inkjet printer 22. Referring to FIG. 4, the procedure of the invention will now be described. Initially, it is assumed that color balance page 50 is already stored in memory 24 and that the user, through the use of mouse 16 and a displayed menu, has invoked color calibration procedure 30. That procedure causes an automatic printing of color balance page 50 on a media sheet (box 60). The user is instructed to click on a specific sub-image which best represents the reference criteria, e.g. the sub-image which best illustrates a black/white representation of the graphical representation within the sub-image (box 62). As indicated above, that reference sub-image can appear in any of sub-image positions A-Y, depending upon drop weight variations as between cyan printhead 23 and magenta printhead 25.

Upon the user clicking on the selected reference sub-image within color balance page 50, the index associated with the selected sub-image is used to address color balance calibration table 52 (box 64). The magenta and cyan drop weight variation values are accessed at the indexed entry and those values are then utilized to adjust the color control parameters 36 in memory 24. More specifically, it is now known that the printheads must be exhibiting the accessed drop weight value variations to cause the reference sub-image to appear at the "clicked-on" position in color balance page 50. Accordingly, each of color control parameters 36 are then adjusted so as to take into account the drop weight variations (box 66).

In general, the drop weight variation values will be employed to alter the number of ink drops deposited per unit of area, rather than to alter the drop weights, themselves.

While the above discussion has principally focused upon variations in drop weight from cyan and magenta printheads 23, 25, those skilled in the art will realize that the derivation of a color calibration control value from a user's input of the position of a reference sub-image from color balance page 50 will also incorporate any color imbalance actions which occur as a result of the media sheet variations, humidity, and other factors. Accordingly, substantially improved color balance is achieved through the use of a straightforward user input that is dependent upon the user's perception of which sub-image meets the criteria for the reference sub-image.

It should be understood that the foregoing description is only illustrative of the invention. Various alternatives and modifications can be devised by those skilled in the art without departing from the invention. For instance, the above discussion has not considered the conversions which might be required of cyan, magenta and yellow image color values to red, green and blue image color values (and vice versa) during operation of the invention. Such conversions can be easily accomplished by inversions of the binary color values, as known to those skilled in the art. Accordingly, the present invention is intended to embrace all such alternatives, modifications and variances which fall within the scope of the appended claims.

We claim:

1. A method for adjusting color balance of printhead means in a color printer, said method comprising the steps of:
   a) providing a matrix of image data, including a reference image data set for a reference image and a plurality of color-modified image data sets for plural color-modified images, said reference image data set comprising in-balance component color data values and each of said color-modified image data sets comprising out-of-balance component color values, each color-modified image data set having different out-of-balance component color data values;
   b) controlling said printhead means to print on a media sheet said reference image and each of said color-modified images at predetermined locations on a media sheet in accord with said matrix of image data, color representations of said reference image and each of said color-modified images being altered on said media sheet if said printhead means is not properly adjusted; and
   c) responding to a user selection of one image on said media sheet as said reference image and a position on said media sheet of said one image, by altering control signals to said printhead means in accord with component color values associated with said position of said one image in said matrix of image data.

2. The method as recited in claim 1, wherein step c) is active only if said position of said one image is other than said predetermined location of said reference image.

3. The method as recited in claim 1, wherein said matrix of printed images produced in step b) comprises a plurality of identical images which exhibit color variations in accord with both said color data values and adjustments of said printhead means.

4. The method as recited in claim 1, wherein said printhead means comprises a pair of inkjet printheads and said control signals are altered in step c) to revise a density of ink drops that are emitted onto said media sheet from said inkjet printheads.

5. The method as recited in claim 1, wherein step c) in response to said user selection, refers to a table which notes color control data for said position of said one image in said matrix of images and applies said color control data for all color printing which employs said printhead means.

6. A memory media for controlling a processor to adjust color balance of printhead means in a color printer, said memory media comprising:
   a) means for controlling said processor to provide a matrix of image data, including a reference image data set for a reference image and a plurality of color-modified image data sets for plural color-modified images, said reference image data set comprising in-balance component color data values and each of said color-modified image data sets comprising out-of-balance component color values, each color-modified image data set having different out-of-balance component color data values;
   b) means for controlling said processor to control said printhead means to print on a media sheet said reference image and each of said color-modified images at predetermined locations on a media sheet in accord with said matrix of image data, color representations of said reference image and each of said color-modified images being altered on said media sheet if said printhead means is not properly adjusted; and
   c) means for controlling said processor to respond to a user selection of one image on said media sheet as said reference image and a position on said media sheet of said one image, by altering control signals to said printhead means in accord with component color values associated with said position of said one image in said matrix of image data.

7. The memory media as recited in claim 6, wherein means c) is active only if said position of said one image is other than said predetermined location of said reference image.

8. The memory media as recited in claim 6, wherein said matrix of printed images produced by means b) comprises a plurality of identical images which exhibit color variations in accord with both said color data values and adjustments of said printhead means.

9. The memory media as recited in claim 6, wherein said printhead means is a pair of inkjet printheads and said control signals are altered by means c) to revise a density of ink drops that are emitted onto said media sheet from said inkjet printheads.

10. The memory media as recited in claim 6, wherein means c), in response to said user selection, refers to a table which notes color control data for said position of said one image in said matrix of images and applies said color control data for all color printing which employs said printhead means.

11. An inkjet printer system having at least two multi-channel printheads for ejecting a plurality of different color ink droplets onto a print medium, comprising:

a calibration arrangement for causing the printheads to eject selectively a plurality of different color ink droplets in a matrix array configuration on a single page of print medium, said matrix array configuration including a plurality of substantially identical images, each image exhibiting a visually perceptible different contrast from the other images in said matrix array for facilitating the calibrating of drop volume variations between the at least two printheads; and a correction arrangement responsive to a selection of an individual one of said plurality of substantially identical images for applying a corresponding hue shift correction factor for substantially balancing any drop volume variations between the at least two printheads relative to any subsequently printed image.

12. An inkjet printer system according to claim 11, wherein said calibration arrangement includes:

a processor for generating a series of sets of one-dimensional look up tables for correcting hue shift introduced by drop volume imbalance between the at least two printheads;

a data storage device coupled to said processor for storing said series of sets of one-dimensional look up tables for correcting hue shift; and a printer driver stored in said data storage device for enabling said processor to communicate control and print data to cause the at least two printheads to eject ink droplets in said matrix array configuration.

13. An inkjet printer system according to claim 12, wherein said correction arrangement includes:

an input device coupled to said processor and said data storage device for generating a selection signal indicative of said selection of an individual one of said plurality of substantially identical images.

14. An inkjet printer system according to claim 13, wherein said printer driver includes:

a color balance conversion algorithm responsive to said selection signal for retrieving from said data storage device at least one control parameter for correcting color shift hue relative to the any subsequently printed image.

15. An inkjet printer system according to claim 11, wherein said plurality of substantially identical images includes one reference image having in-balance component color data values.

16. An inkjet printer system according to claim 15, wherein said plurality of substantially identical images further includes a plurality of color-modified images each having different outof-balance component color data values from one another.

17. A method of color balance calibration and correction in an inkjet printer system having at least two multi-channel printheads for ejecting a plurality of different color ink droplets onto a print medium, comprising:

energizing selectively the at least two printheads to eject a plurality of different color ink droplets in a matrix array configuration on a single page of print medium, said matrix array configuration including a plurality of substantially identical images, each image exhibiting a visually perceptible different contrast from the other images for facilitating the balancing of drop volume variations between the at least two printheads;

selecting an individual one of said plurality of substantially identical images; and applying a corresponding hue shift correction factor in response to the selected image to substantially balance the drop volume variations between the at least two printheads relative to any subsequently printed image.

18. A calibration and correction method according to claim 17, wherein said step of energizing includes:

generating a series of sets of one-dimensional look up tables for correcting hue shift introduced by drop volume imbalance between the at least two printheads;

storing said series of sets of one-dimensional look up tables for correcting hue shift;

providing a communication channel for control and print data to facilitate the printing of said plurality of substantially identical images on the single page of print medium; and communicating control and print data to cause the at least two printheads to eject ink droplets in said matrix array configuration.

19. A calibration and correction method according to claim 18, wherein said step of selecting includes:

generating a selection signal indicative of the selection of an individual one of said plurality of substantially identical images.

20. A calibration and correction method according to claim 19, wherein said step of applying includes:

retrieving from a data storage device in response to said selection signal at least one control parameter for correcting color shift hue relative to the any subsequently printed image.

* * * * *